United States Patent
Kwon et al.

(10) Patent No.: US 9,170,688 B2
(45) Date of Patent: Oct. 27, 2015

(54) APPARATUS AND METHOD FOR SENSING CAPACITANCE, AND TOUCH SCREEN APPARATUS

(75) Inventors: Yong Il Kwon, Gyunggi-do (KR); Moon Suk Jeong, Gyunggi-do (KR); Byeong Hak Jo, Gyunggi-do (KR); Hyun Suk Lee, Gyunggi-do (KR); Tah Joon Park, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 307 days.

(21) Appl. No.: 13/597,573

(22) Filed: Aug. 29, 2012

(65) Prior Publication Data
US 2013/0321326 A1    Dec. 5, 2013

(30) Foreign Application Priority Data
May 30, 2012    (KR) .................. 10-2012-0057390

(51) Int. Cl.
   *G06F 3/044*    (2006.01)
   *G06F 3/041*    (2006.01)

(52) U.S. Cl.
   CPC .............. *G06F 3/044* (2013.01); *G06F 3/0416* (2013.01)

(58) Field of Classification Search
   CPC ..... G06F 3/044; G06F 3/0416; G06F 3/0418; G06F 3/041
   USPC ....................................................... 345/174
   See application file for complete search history.

(56) References Cited

U.S. PATENT DOCUMENTS

| | | | |
|---|---|---|---|
| 4,698,461 A * | 10/1987 | Meadows et al. | 345/174 |
| 2008/0157893 A1* | 7/2008 | Krah | 331/177 R |
| 2008/0309628 A1* | 12/2008 | Krah et al. | 345/173 |
| 2009/0009483 A1 | 1/2009 | Hotelling et al. | |
| 2010/0328256 A1 | 12/2010 | Harada et al. | |
| 2011/0163768 A1* | 7/2011 | Kwon et al. | 324/686 |
| 2011/0273400 A1* | 11/2011 | Kwon et al. | 345/174 |
| 2013/0127773 A1* | 5/2013 | Kwon et al. | 345/174 |

FOREIGN PATENT DOCUMENTS

| | | |
|---|---|---|
| JP | 2011-8726 | 1/2011 |
| KR | 1998-0010726 | 4/1998 |
| KR | 10-2011-0061798 | 6/2011 |
| KR | 10-2011-0126026 | 11/2011 |
| WO | WO 98/02964 | 1/1998 |

OTHER PUBLICATIONS

Korean Office Action mailed Aug. 28, 2013, corresponding to Korean Patent Application 10-2012-0057390.

* cited by examiner

*Primary Examiner* — Dorothy Harris
(74) *Attorney, Agent, or Firm* — NSIP Law

(57) ABSTRACT

There are provided an apparatus for sensing capacitance, a method for sensing capacitance, and a touch screen apparatus. The apparatus for sensing capacitance includes; a driving circuit unit applying driving signals to a first capacitor; an integration circuit unit including a second capacitor and a third capacitor respectively charged by a change in capacitance generated in the first capacitor based on the driving signals to generate a predetermined output voltage and calculating a voltage difference between the output voltage of the second capacitor and the output voltage of the third capacitor; and a control unit determining characteristics of a noise signal based on the voltage difference and controlling the driving signals based on the characteristics of the noise signal.

17 Claims, 5 Drawing Sheets

APPARATUS AND METHOD FOR SENSING CAPACITANCE, AND TOUCH SCREEN APPARATUS

CROSS-REFERENCE TO RELATED APPLICATIONS

This application claims the priority of Korean Patent Application No. 10-2012-0057390 filed on May 30, 2012, in the Korean Intellectual Property Office, the disclosure of which is incorporated herein by reference.

BACKGROUND OF THE INVENTION

1. Field of the Invention

The present invention relates to an apparatus and a method for sensing capacitance and a touch screen apparatus, capable of minimizing an effect of noise by estimating frequencies of noise signals using a difference between output voltages of capacitors integrated in different directions from a change in capacitance to be measured, and controlling frequencies of driving signals therefrom.

2. Description of the Related Art

A touch sensing apparatus, such as a touch screen, a touch pad, and the like, is an input apparatus that is attached to a display apparatus to provide an intuitive input method to a user and has, in recent times, been prevalently applied to various electronic apparatuses such as mobile phones, personal digital assistants (PDAs), navigation devices, and the like. In particular, as demand for smart phones has recently increased, the use of a touch screen as a touch sensing apparatus capable of providing various input methods in a restricted form factor has been increased on a daily basis.

Touch screens applied to mobile devices may largely be classified into resistive-type touch screens and capacitive-type touch screens, according to a method of sensing a touch input utilized therein. Among the touch screens, the use of capacitive-type touch screens has been gradually increased owing to a relatively long lifespan, various input methods, easy implementation of gestures, and the like. In particular, a multi-touch interface may be more easily implemented in capacitive-type touch screens than in resistive-type touch screens, and as a result, has been widely applied to devices such as smart phones, and the like.

The capacitive-type touch screen includes a plurality of electrodes having a predetermined pattern, wherein a plurality of nodes in which a change in capacitance occurring due to a touch input is provided by the plurality of electrodes. The self-capacitance or mutual-capacitance of the plurality of nodes distributed on a two-dimensional plane may be changed by the touch input. Here, a weight average calculation method, and the like, may be applied to the change in capacitance occurring in the plurality of nodes to calculate coordinates of a touch input. In order to accurately calculate the coordinates of a touch input, a technology of accurately sensing the change in capacitance that occurs due to a touch input is required. However, when electrical noise occurs in a wireless communication module display apparatus, or the like, a change in capacitance cannot be accurately sensed.

Patent Document 1 discloses a touch sensor chip using dynamic frequency modulation and an operating method thereof, but discloses a method for changing a frequency of a sensing signal rather than frequencies of driving signals and therefore, is different from the contents of the present invention. In addition, Patent Document 2 discloses the contents of applying a plurality of driving signals having different frequencies, but does not disclose the contents of estimating frequencies of noise signals from results obtained by measuring a change in capacitance and determining frequencies of driving signals therefrom.

RELATED ART DOCUMENT (Patent Document 1) Korean Patent Laid-Open Publication No. 10-2011-0061798
(Patent Document 2) Korean Patent Laid-Open Publication No. 10-1998-0010726

SUMMARY OF THE INVENTION

An aspect of the present invention provides an apparatus for sensing capacitance, a method for sensing capacitance, and a touch screen apparatus, capable of minimizing an effect of noise signals by estimating frequencies of noise signals from results obtained by measuring a change in capacitance and selecting frequencies of driving signals therefrom.

According to an aspect of the present invention, there is provided an apparatus for sensing capacitance, the apparatus including; a driving circuit unit applying driving signals to a first capacitor; an integration circuit unit including a second capacitor and a third capacitor respectively charged by a change in capacitance generated in the first capacitor based on the driving signals to generate a predetermined output voltage and calculating a voltage difference between the output voltage of the second capacitor and the output voltage of the third capacitor; and a control unit determining characteristics of a noise signal based on the voltage difference and controlling the driving signals based on the characteristics of the noise signal.

The control unit may determine a frequency and a phase of the noise signal based on the voltage difference.

The control unit may hop frequencies of the driving signals so as to have values different from the frequency of the noise signal.

The integration circuit unit may include: a first integration circuit including the second capacitor and non-inversion-integrating the second capacitor by the driving signals; and a second integration circuit including the third capacitor and inversion-integrating the third capacitor by the driving signals.

The control unit may include; a comparison circuit unit comparing the voltage difference with a predetermined reference voltage; and a signal processing unit determining a frequency of the noise signal based on the comparison of the comparison circuit unit and controlling frequencies of the driving signals.

The comparison circuit unit may compare the voltage difference with a first reference level and a second reference level different from the first reference level, respectively, and the signal processing unit may determine the frequencies of the driving signals applied to the first capacitor to be the frequency of the noise signal when the voltage difference is larger than the first reference level or lower than the second reference level.

The control unit may control the driving circuit unit such that a plurality of the driving signals having different frequencies are sequentially applied to the first capacitor and control the integration circuit unit such that the second capacitor and the third capacitor are charged for a length of time corresponding to the same number of clocks of the plurality of driving signals, respectively.

According to another aspect of the present invention, there is provided a method for sensing capacitance, the method including: applying driving signals to a first capacitor; generating a first output voltage and a second output voltage from the first capacitor by charging each of a second capacitor and a third capacitor; calculating a voltage difference between the first output voltage and the second output voltage; determining characteristics of a noise signal from the voltage difference; and controlling the driving signals applied to the first capacitor.

In the applying of the driving signals, a plurality of driving signals having different frequencies may be sequentially applied to the first capacitor.

In the determining of the characteristics of a noise signal, when the voltage difference is larger than a first reference level or lower than a second reference level, the frequencies of the driving signals applied to the first capacitor may be determined to be a frequency of the noise signal.

In the generating of the voltages, for each of the plurality of driving signals having different frequencies, the first output voltage and the second output voltage may be generated by charging the second capacitor and the third capacitor for a length of time corresponding to the same number of clocks.

In the generating of the voltages, the second capacitor may be non-inversion-integrated by the driving signals applied to the first capacitor to generate the first output voltage, and the third capacitor may be inversion-integrated by the driving signals applied to the first capacitor to generate the second output voltage.

In the determining of the characteristics of a noise signal, a frequency and a phase of the noise signal may be determined from the voltage difference.

In the controlling of the driving signals, frequencies of the driving signals may be hopped so as to have values different from the frequency of the noise signal.

According to another aspect of the present invention, there is provided a touch screen apparatus including: a panel unit including a plurality of node capacitors respectively defined at intersecting points between a plurality of first electrodes and a plurality of second electrodes; a driving circuit unit applying driving signals to the node capacitors; a sensing circuit unit including a first capacitor and a second capacitor, respectively charged by a change in capacitance generated in the capacitors based on the driving signals to generate a predetermined output voltage and calculating a voltage difference between the output voltage of the first capacitor and the output voltage of the second capacitor; and a control unit determining characteristics of a noise signal based on the voltage difference and controlling the driving signals based on the characteristics of the noise signal.

The control unit may determine frequencies of the driving signals applied to the node capacitors by the driving circuit unit to be a frequency of the noise signal when the voltage difference is larger than a first reference level or lower than a second reference level.

The control unit may control the driving circuit unit such that the driving signals having frequencies different from the frequency of the noise signal are applied to the node capacitors.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
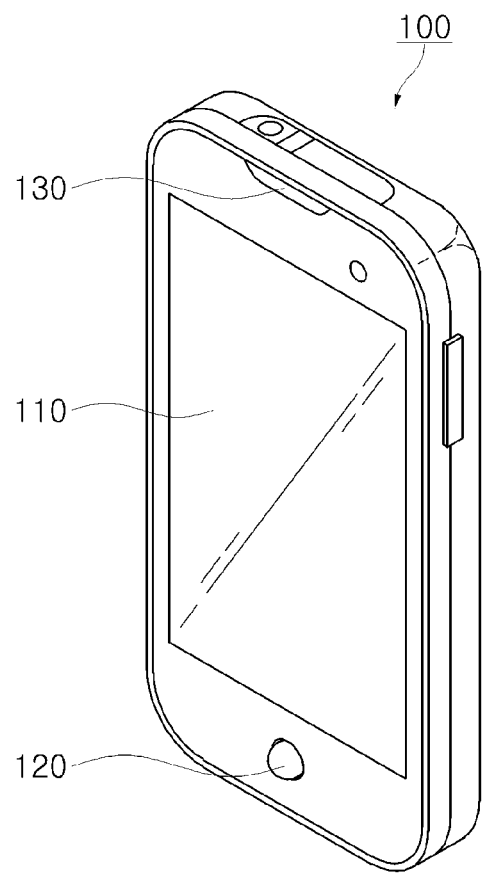
FIG. 1 is a perspective view illustrating an appearance of an electronic apparatus including a touch screen apparatus according to an embodiment of the present invention.

Hereinafter, embodiments of the present invention will be described in detail with reference to the accompanying drawings. These embodiments will be described in detail to allow those skilled in the art to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that positions and arrangements of individual components in each disclosed embodiment may be changed without departing from the spirit and the scope of the present invention. Therefore, a detailed description provided below should not be construed as being restrictive. In addition, the scope of the present invention is defined only by the accompanying claims and their equivalents if appropriate. Similar reference numerals will be used to describe the same or similar functions throughout the accompanying drawings.

Hereinafter, embodiments of the present invention will be described in detail with reference to the accompanying drawings so that those skilled in the art may easily practice the present invention.

FIG. 1 is a perspective view illustrating an appearance of an electronic apparatus including a touch screen apparatus according to an embodiment of the present invention. Referring to FIG. 1, an electronic apparatus 100 according to an embodiment of the present invention includes a display apparatus 110 for outputting a screen, an input unit 120, an audio unit 130 for outputting audio information, and the like, and may include a touch screen apparatus integrated with the display apparatus 110.

As shown in FIG. 1, in the case of mobile equipment, a touch screen apparatus is generally integrated with a display apparatus. The touch screen apparatus needs to have light transmittance sufficiently high to allow a screen on which the display apparatus is displayed to transmit an image therethrough. Therefore, the touch screen apparatus may be implemented by forming sensing electrodes with materials such as indium-tin oxide (ITO), indium zinc oxide (IZO), zinc oxide (ZnO), carbon nano tube (CNT), graphene, and the like, all of which have transparency and electric conductivity, on a base substrate made of transparent film materials such as polyethylene terephthalate (PET), polycarbonate (PC), polyethersulfone (PES), polyimide (PI), and the like. Wiring patterns connected to sensing electrodes made of transparent conductive materials are disposed in a bezel area of the display apparatus. Wiring patterns are visually shielded and therefore, can also be formed of metal materials such as silver (Ag), copper (Cu), and the like.

Meanwhile, it is assumed that the touch screen apparatus according to the embodiment of the present invention operates according to a capacitive scheme. Thus, the touch screen apparatus may include a plurality of electrodes having a predetermined pattern. In addition, the touch screen apparatus includes an apparatus for sensing capacitance in order to detect a change in capacitance occurring in the plurality of electrodes. Hereinafter, the apparatus for sensing capacitance and the operating method thereof according to the embodiment of the present invention will be described with reference to FIGS. 2 and 3.

Figure 2:
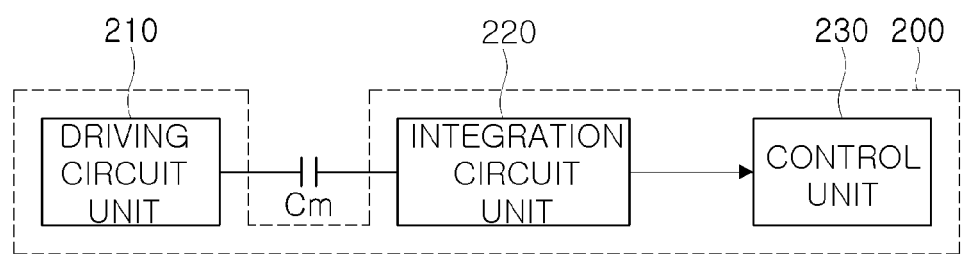
FIG. 2 is a block diagram illustrating an apparatus for sensing capacitance according to an embodiment of the present invention.

FIG. 2 is a block diagram illustrating an apparatus for sensing capacitance according to an embodiment of the present invention. Referring to FIG. 2, an apparatus 200 for sensing capacitance according to the embodiment of the present invention may include a driving circuit unit 210, an integration circuit unit 220, and a control unit 230. A capacitor Cm in which a change in capacitance to be measured occurs may be connected between the driving circuit unit 210 and the integration circuit unit 220.

In FIG. 2, the capacitor Cm corresponds to a capacitor in which the capacitance to be measured by the apparatus 200 for sensing capacitance according to the embodiment of the present invention is charged. For example, the capacitor Cm may correspond to mutual-capacitance occurring among the plurality of electrodes that are included in the capacitive touch screen. Hereinafter, for convenience of explanation, it is assumed that the apparatus 200 for sensing capacitance according to the embodiment of the present invention senses the change in capacitance occurring in the capacitive touch screen. In this case, it may be assumed that the capacitor Cm is a node capacitor in which charges are charged or discharged due to the change in mutual capacitance occurring in an intersecting point of the plurality of electrodes.

The driving circuit unit 210 may generate a predetermined driving signal for charging a voltage in the capacitor Cm and supply the generated driving signal to the capacitor Cm. The driving signal may be a square wave having a pulse form and have a predetermined frequency. The integration circuit unit 220 includes at least one capacitor and the capacitor included in the integration circuit unit 220 is supplied with charges charged in the capacitor Cm and is thus charged or discharged. The integration circuit unit 220 generates an output voltage from the amount of charges charged in the capacitor or discharged from the capacitor. That is, the output voltage of the integration circuit unit 220 may be determined according to a capacity of the capacitor Cm, a capacity of the capacitor included in the integration circuit unit, a voltage level of the driving signal, or the like.

The control circuit unit 230 converts output voltage from the integration circuit unit 220 into a digital signal and performs signal processing thereon, and thus, may determine whether the driving signal applied to the capacitor Cm by the driving circuit unit 210 includes noise, based on a signal processing result. A noise signal affecting the node capacitor present in the capacitive touch screen may have a specific frequency. In this case, the control unit 230 may determine whether a frequency of the driving signal is similar to a frequency of the noise signal using the output voltage from the integration circuit unit 220.

As the determination result of the control unit 230, when the frequency of the driving signal coincides with or is similar to the frequency of the noise signal, the control unit 230 may control the driving circuit unit 210 to supply a driving signal having a different frequency to the capacitor Cm. The driving circuit unit 210 may control operational times of a plurality of switches connected to voltage nodes having different levels to generate the driving signal having various frequencies and the control unit 230 may control an operation of the plurality of switches to hop the frequencies of the driving signal. Hereinafter, a detailed operation of the apparatus 200 for sensing capacitance according to the embodiment of the present invention will be described with reference to a circuit diagram of FIG. 3.

Figure 3:
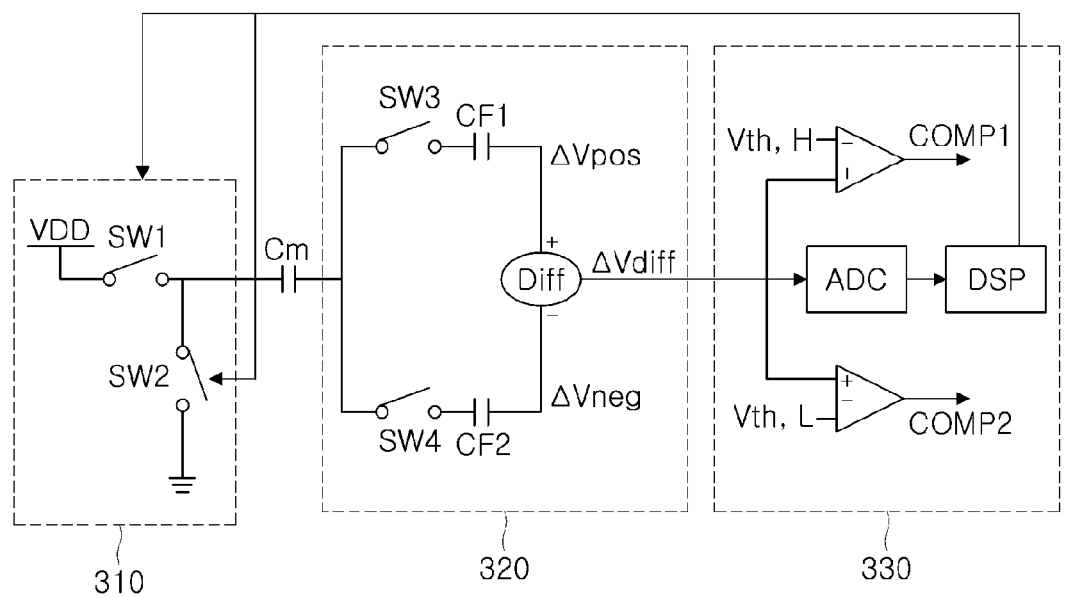
FIG. 3 is a circuit diagram illustrating an apparatus for sensing capacitance according to an embodiment of the present invention.

FIG. 3 is a circuit diagram illustrating an apparatus for sensing capacitance according to an embodiment of the present invention.

Referring to FIG. 3, an apparatus for sensing capacitance according to the embodiment of the present invention may include a driving circuit unit 310, an integration circuit unit 320, and a control unit 330. Hereinafter, a detailed operation of the apparatus for sensing capacitance according to the embodiment of the present invention will be described with reference to the circuit diagram shown in FIG. 3. In like manner to FIG. 2, the capacitor Cm may correspond to the node capacitor of the capacitive touch screen.

First, the driving circuit unit 310 includes two switches SW1 and SW2, wherein the switch SW1 is connected to a node supplying voltage VDD and a first node of the capacitor Cm. Meanwhile, a switch SW2 is connected to a ground terminal GND and the first node of the capacitor Cm. Therefore, the switches SW1 and SW2 may operate with different turn-on times. That is, when the switch SW1 is turned-on (shorted), the switch SW2 is turned-off (opened), while when the switch SW2 is turned-on, the switch SW1 is turned-off.

Meanwhile, a second node of the capacitor Cm is connected to the integration circuit unit 320. The first integration circuit unit 320 may include capacitors CF1 and CF2, switches SW3 and SW4, and the like. The switch SW3 may operate in a period identical to that of the switch SW1 of the driving circuit unit 310 and the switch SW4 may operate in a period identical to that of the switch SW2 of the driving circuit unit 310. Therefore, charges are supplied to the capacitor CF1 of the integration circuit unit 320 through the capacitor Cm by the turn-on and -off operations of the switches SW1 and SW3. On the other hand, charges are supplied to the capacitor CF2 of the integration circuit unit 320 through the capacitor Cm by the turn-on and -off operations of the switches SW2 and SW4.

In this case, the switch SW1 is connected to the node supplying voltage VDD node and the switch SW2 is connected to the ground terminal GND, such that the capacitors CF1 and CF2 are charged with charges in mutually opposing directions. That is, output voltages generated due to charges charged in the capacitors CF1 and CF2 may be determined by the following Equation 1.

$$\Delta Vpos = \sum_{n=1}^{k} \left[ \frac{Cm}{CF1} VDD + fn1 \right]$$

$$\Delta Vneg = \sum_{n=1}^{k} \left[ -\frac{Cm}{CF2} VDD + fn2 \right]$$

[Equation 1]

In Equation 1, $\Delta Vpos$ and $\Delta Vneg$ respectively represent voltages output by charges charged in the capacitors CF1 and CF2. As represented by Equation 1, the output voltages of the capacitors CF1 and CF2 may have different signals by the switches SW1 and SW2 of the driving circuit unit that are alternately switched at different phases. In Equation 1, fn1 and fn2 represent noise signals affecting an operation of the apparatus for sensing capacitance. A constant k for calculating the output voltages ΔVpos and ΔVneg means switching frequencies of the switches SW1 and SW2 that are operated at a frequency of fc.

The integration circuit unit 320 calculates a voltage difference between the output voltages ΔVpos and ΔVneg of the capacitors CF1 and CF2. As shown in FIG. 3, the integration circuit unit 320 may include a subtractor (Diff) for calculating the difference in the output voltages of the respective capacitors. When capacitance values of the capacitors CF1 and CF2 included in the integration circuit unit 320 are equal to each other and the noise signals affecting each of the capacitors CF1 and CF2 are equal to each other, fn1 is equal to fn2 and thus, a voltage difference ΔVdiff output by the subtractor Diff may be represented by the following Equation 2. In this case, it is assumed that operational frequencies of the switches SW1 and SW2 of the driving circuit unit 310 are very larger than the frequency of the noise signal fn1.

$$\Delta Vdiff = 2\sum_{n=1}^{k}\left[\frac{Cm}{CF1}VDD\right] \quad \text{[Equation 2]}$$

Meanwhile, when the capacitance values of the capacitors CF1 and CF2 are equal to each other, the noise signals affecting each of the capacitors CF1 and CF2 have the same absolute value but different signs, and the frequencies of the noise signals are similar to the operational frequencies of the switches SW1 and SW2, the noise signals may affect an output of the subtractor Diff unlike Equation 2. In the case of the above description, the voltage difference ΔVdiff output by the subtractor Diff may be represented by the following Equation 3.

$$\Delta Vdiff = \sum_{n=1}^{k}\left[2\frac{Cm}{CF1}VDD \pm (fn1 + fn2)\right] \quad \text{[Equation 3]}$$

That is, as can be appreciated from Equations 2 and 3, the voltage difference ΔVdiff output by the subtractor Diff varies according to frequencies and phases of the noise signals. In particular, when the frequencies of the noise signals are similar to the operational frequencies of the SW1 and SW2, it can be appreciated that the frequencies of the noise signals affect the voltage difference ΔVdiff output from the subtractor Diff. When the switches SW1 and SW2 are operated at a frequency similar to the frequencies of the noise signals and thus, the capacitor Cm has a driving signal in a pulse form and having a frequency similar to that of the noise signals, an effect of the noise signals may be reflected to the voltage difference ΔVdiff output from the subtractor Diff, as represented by Equation 3.

The control unit 330 compares the voltage difference ΔVdiff output from the subtractor Diff with reference voltages VthH and VthL. A comparison circuit included in the control unit 330 generates a first comparison signal COMP1 obtained by comparing the ΔVdiff with the reference voltage VthH and a second comparison signal COMP2 obtained by comparing the ΔVdiff with the reference voltage VthL. In this case, the reference voltage VthH may have a relatively higher level than the VthL.

When a noise signal is not introduced or an effect of the noise signal is offset by the subtractor Diff, a level of the voltage difference ΔVdiff output from the integration circuit unit 320 is lower than that of the reference voltage VthH and larger than that of the reference voltage VthL. On the other hand, when a noise signal having a predetermined intensity or greater is introduced or an effect of the noise signal is not offset by the subtractor Diff, the level of the voltage difference ΔVdiff output from the integration circuit unit 320 may be larger than that of the reference voltage VthH and lower than that of the reference voltage VthL. When the level of the voltage difference ΔVdiff is larger than the reference voltage VthH, the first comparison signal COMP1 has a high value while when the level of the voltage difference ΔVdiff is lower than the reference voltage VthL, the second comparison signal COMP2 has a high value.

Therefore, the control unit 330 may determine that a noise signal is introduced or an effect of the introduced noise signal is not offset in the integration circuit unit 320, when any one of the first comparison signal COMP1 and the second comparison signal COMP2 has a high value. In this case, signal processing units ADC and DSP of the control unit 330 control the operational frequencies of the switches SW1 and SW2 of the driving circuit unit 310 so not to coincide the frequency of the driving signal applied to the capacitor Cm with that of the noise signal, thereby reducing the effect of the noise signal. Hereinafter, this will be described with reference to graphs of FIGS. 6 and 7.

Figure 6:
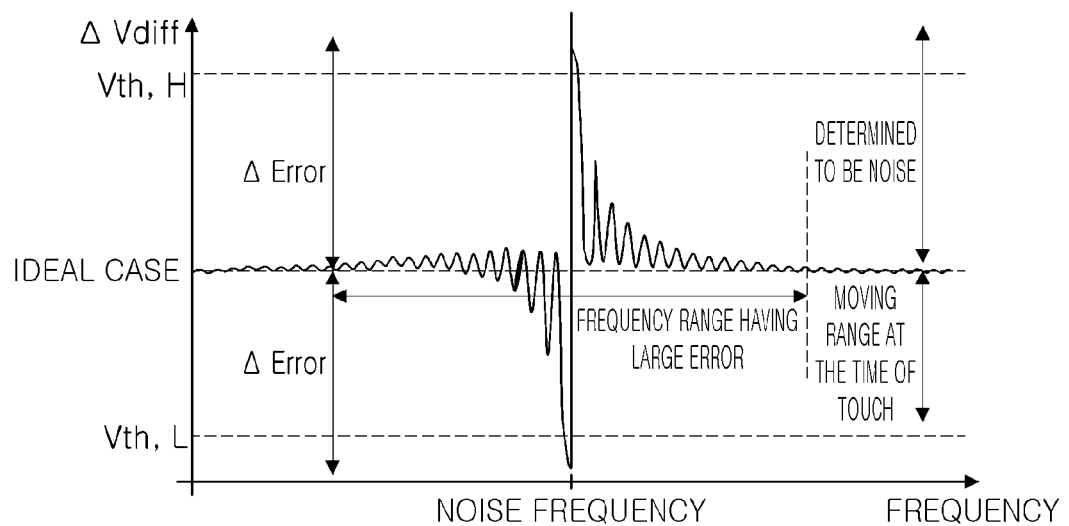
FIGS. 6 and 7 are diagrams for describing an operation of an apparatus for sensing capacitance according to an embodiment of the present invention.
Figure 7:
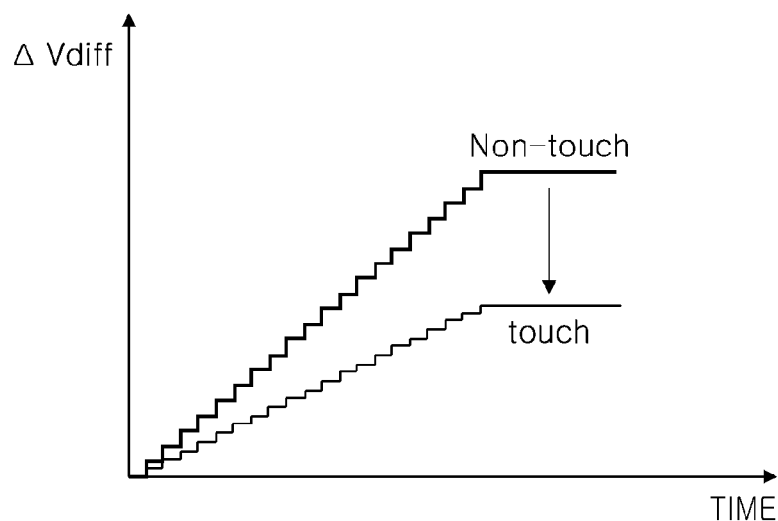

FIGS. 6 and 7 are diagrams for describing an operation of an apparatus for sensing capacitance according to an embodiment of the present invention.

In FIG. 6, a horizontal axis represents the frequency of the driving signal and a vertical axis represents the level of the voltage difference ΔVdiff output by the subtractor Diff of the integration circuit unit 320. The frequency of the driving signal, which is a frequency of a signal applied to the capacitor Cm by the driving circuit unit 310, may be determined by an operational period of the switches SW1 and SW2. For example, when it is assumed that the switch SW1 has a period of 10 μs and has a turn-on time of 5 μs and a turn-off time of 5 μs within on period, the frequency of the driving signal may be determined to be 100 kHz.

Referring to FIG. 6, when a noise frequency is present in a central point of the horizontal axis and the level of the voltage difference ΔVdiff has a value larger than that of the reference voltage VthH or lower than that of the reference voltage VthL in a frequency band neighboring the noise frequency. Therefore, a frequency band in the range of upper and lower limits based on the noise frequency may be defined by a frequency range in which the effect of the noise signal is large.

The control unit 330 controls the operational period of the switches SW1 and SW2 to control the frequency of the driving signal and compares the level of the voltage difference ΔVdiff output by the subtractor Diff with that of the reference voltages VthH and VthL at a specific frequency of the driving signal to determine the degree to which the frequency of the driving signal currently applied to the capacitor Cm has a value similar to that of the noise signal. In addition, since a waveform of the voltage difference ΔVdiff according to the frequency has a different value according to a phase of the noise signal in addition to the frequency of the noise signal, the waveform of the voltage difference ΔVdiff according to the frequency may be analyzed to detect the phase of the noise signal. For example, the graph of the frequency–voltage difference ΔVdiff shown in FIG. 6 illustrates the case in which the phase of the noise signal is 0°.

When the level of the voltage difference ΔVdiff output by the subtractor Diff is larger than that of the reference voltage VthH or lower than that of the reference voltage VthL, the control unit 330 determines that the noise signal having a frequency similar to that of the driving signal affects the apparatus for sensing capacitance. Therefore, the control unit 330 may perform a control so that the driving signal having a frequency value different from the frequency of the noise signal is applied to the capacitor Cm by increasing and decreasing the frequencies of the switches SW1 and SW2.

FIG. 7 is a graph schematically illustrating the integration results in the case in which a touch input is not present and the case in which the touch input is present, respectively. As shown in FIG. 7, the level of the voltage difference ΔVdiff output by the subtractor Diff of the integration circuit unit 320 may be seen to decrease at all times when the touch input is present. Therefore, it can be appreciated that the noise signal is introduced when the voltage difference ΔVdiff having a level larger than a level assumed as an ideal case in the graph of FIG. 6 is detected.

Figure 4:
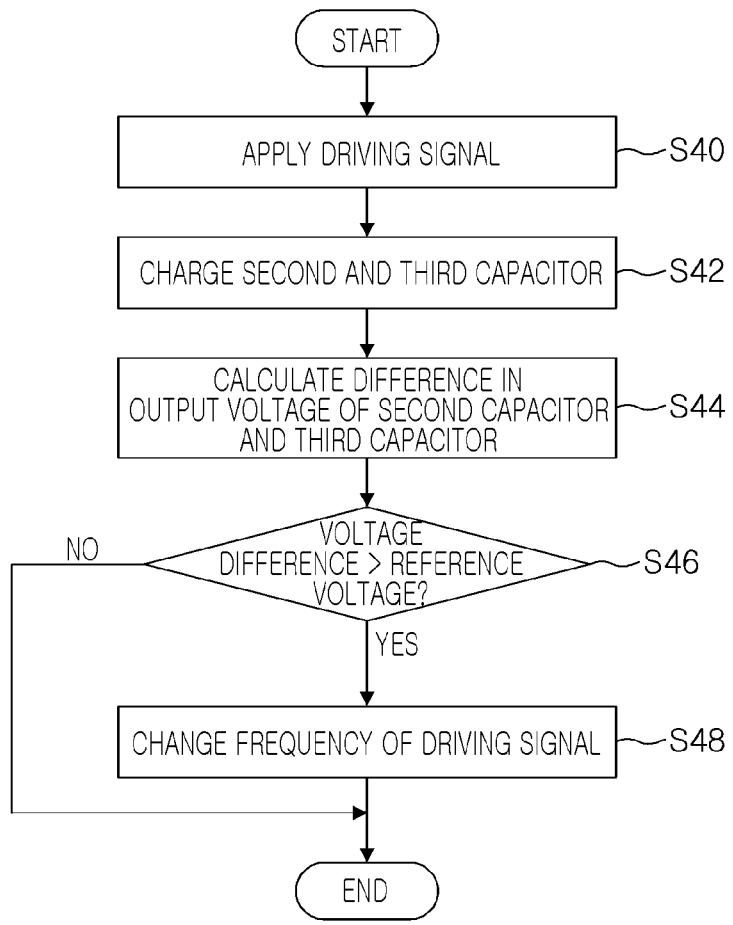
FIG. 4 is a flow chart for describing a method for sensing capacitance according to an embodiment of the present invention.

FIG. 4 is a flow chart for describing a method for sensing capacitance according to an embodiment of the present invention.

Referring to FIG. 4, the method for sensing capacitance according to the embodiment of the present invention starts with applying the driving signal by the driving circuit unit 310 to the first capacitor (S40). In FIGS. 2 and 3, the first capacitor is the capacitor Cm. As described above, the driving circuit unit includes the switch SW1 connected between the node supplying the voltage and the capacitor Cm and the switch SW2 connected between the ground terminal and the capacitor Cm. The driving signal may be a signal in the pulse form, having a predetermined frequency and the frequency of the driving signal may be determined according to the period and the turn-on time of the switches SW1 and SW2. The switch SW2 may be turned-off during the turn-on time of the switch SW1 and the switch SW2 may be turned-on during the turn-off time of the switch SW1.

When the driving signal is applied, the second and third capacitors are charged through the capacitor Cm (S42). In FIGS. 2 and 3, the second and third capacitors correspond to the capacitors CF1 and CF2 included in the integration circuit unit 320. The capacitors CF1 and CF2 are each connected to the capacitor Cm through the switches SW3 and SW4 and the switches SW3 and SW4 may each operate at the same period and turn-on time as those of the switches SW1 and SW2 of the driving circuit unit 310.

The subtractor Diff of the integration circuit unit 320 calculates the output voltage ΔVpos and ΔVneg of the second and third capacitors CF1 and CF2. As shown in FIG. 6, the voltage difference ΔVdiff calculated by the subtractor Diff has a level varying according to a frequency, in particular, may have a level larger than that of the reference voltage VthH or lower than that of the reference voltage VthL in a frequency band neighboring the frequency of the noise signal. The control unit 330 compares the voltage difference ΔVdiff calculated by the subtractor Diff with the reference voltages VthH and VthL, respectively, to determine whether the noise signal affects an operation of the apparatus for sensing capacitance (S46).

As the determination result of process S46, the level of the voltage difference ΔVdiff in the frequency of the driving signal supplied by the driving circuit unit 310 to the capacitor Cm has a value between the reference voltages VthH and VthL and when the level of the voltage difference ΔVdiff is not larger than the level of an ideal case, it is determined that the noise signal does not affect the operation of the apparatus for sensing capacitance.

On the other hand, as the determination result of process S46, when the level of the voltage difference ΔVdiff is larger than that of the reference voltage VthH or lower than that of the reference voltage VthL or the level of the voltage difference ΔVdiff is larger than the level of an ideal case, it may be determined that the frequency of the driving signal supplied to the capacitor Cm has a value similar to the frequency of the noise signal. Therefore, the control unit 330 may control the period, the turn-on time, and the like, of the switches SW1 and SW2 included in the driving circuit unit 310 to change the frequency of the driving circuit, thereby excluding or minimizing the effect of the noise signal (S48).

In addition, the control unit 330 may change the period and the turn-on time of the switches SW1 and SW2 included in the driving circuit unit 310 to change the frequency of the driving signal and may compare the level of the voltage difference ΔVdiff with the reference voltages VthH and VthL based on the driving signal currently generated by the driving circuit unit 310 to perform a frequency hopping operation. That is, when the voltage difference ΔVdiff is compared to the reference voltages VthH and VthL while a frequency sweep operation is being performed, the frequency sweep operation changing a low frequency driving signal into a high frequency driving signal or vice-versa, randomly changing a frequency, the frequency of the noise signal may be determined from the comparison result. The control unit 330 may hop the frequency of the driving signal from the frequency of the determined noise signal to a frequency having a minimum effect, thereby minimizing the effect of noise.

Figure 5:
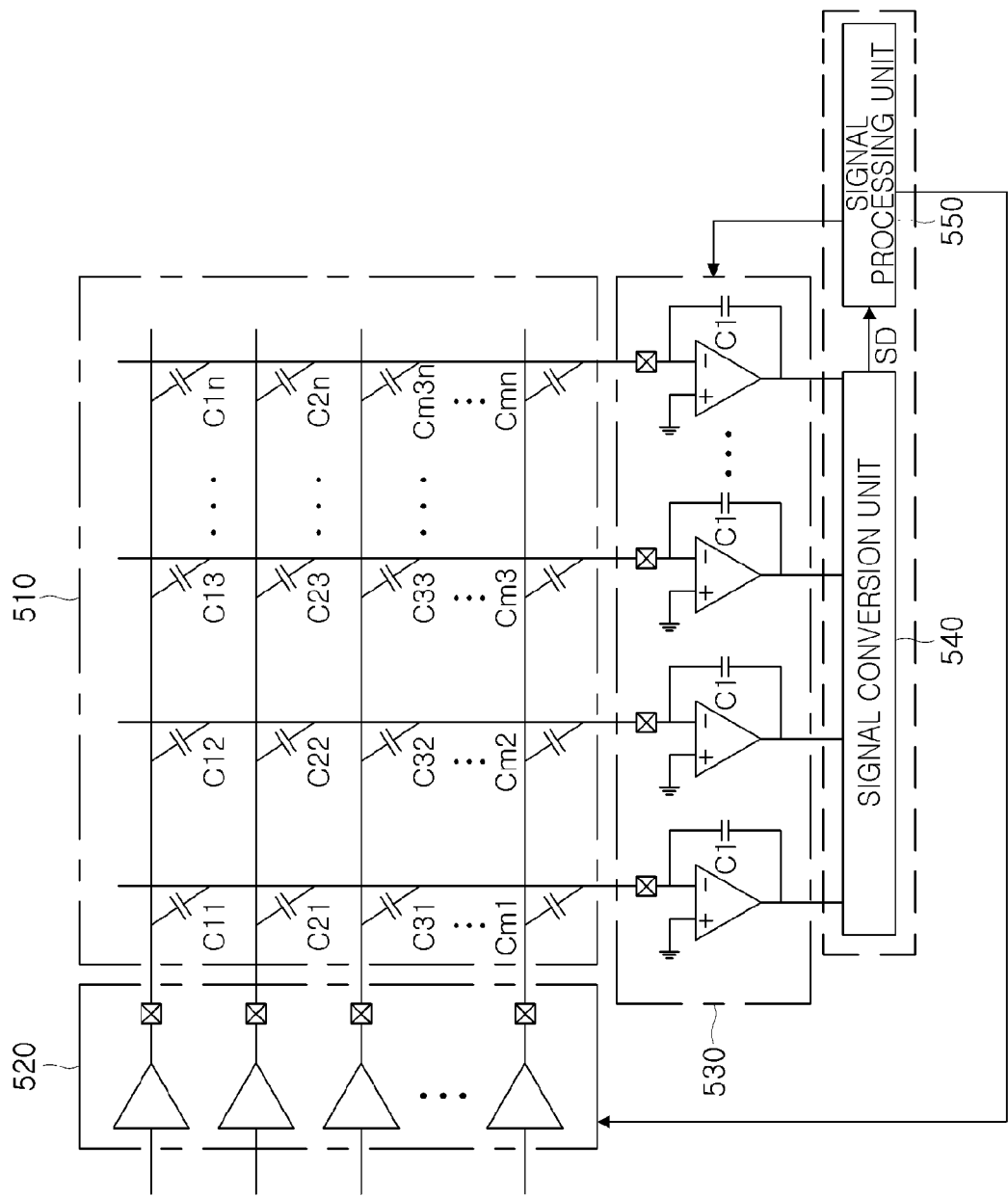
FIG. 5 is a diagram illustrating a touch screen apparatus including an apparatus for sensing capacitance according to an embodiment of the present invention.

FIG. 5 is a diagram illustrating a touch screen apparatus including an apparatus for sensing capacitance according to an embodiment of the present invention.

Referring to FIG. 5, the touch screen apparatus according to the embodiment of the present invention includes a panel unit 510, a driving circuit unit 520, a sensing circuit unit 530, a signal conversion unit 540, and an operation unit 550. The panel unit 510 includes a plurality of first electrodes extending in a first axis direction (a horizontal direction of FIG. 5) and a plurality of second electrodes extending in a second axis direction (a vertical direction of FIG. 5) intersecting with the first axis and has a change in capacitance C11 to Cmn occurring in intersecting points of the first electrodes and the second electrodes. The change in capacitance C11 to Cmn occurring in the intersecting points of the first electrodes and the second electrodes may be the change in mutual-capacitance occurring due to the driving signals applied to the first electrodes by the driving circuit unit 520. Meanwhile, the driving circuit unit 520, the sensing circuit unit 530, the signal conversion unit 540, and the operation unit 550 may be implemented as a single integrated circuit (IC).

The driving circuit unit 520 may apply predetermined driving signals to the first electrodes of the panel unit 510. The driving signals may include a square wave, a sine wave, a triangle wave, and the like, each having a predetermined period and amplitude and may be sequentially applied to the plurality of first electrodes, respectively. FIG. 5 shows the case in which circuits for generating and applying the driving signals are individually connected to the plurality of first electrodes. However, a configuration in which a single driving signal generation circuit is provided to apply driving signals to the plurality of first electrodes, respectively, using a switching circuit, may also be allowed.

The sensing circuit unit 530 may include an integration circuit for sensing the change in capacitance C11 to Cmn from the second electrodes. The integration circuit may include at least one operation amplifier and a capacitor C1 having a predetermined capacity. An inverting input terminal of the operation amplifier is connected to the second electrodes to convert the change in capacitance C11 to Cmn into an analog signal such as a voltage signal, or the like, thereby outputting the converted signal. When the driving signals are sequentially applied to the plurality of first electrodes, respectively, the change in capacitance may be simultaneously detected from the plurality of second electrodes and therefore, the integration circuit may be provided in an amount corresponding to the number m of second electrodes.

The signal conversion unit 540 generates a digital signal $S_D$ from the analog signal generated by the integration circuit. For example, the signal conversion unit 540 may include a time-to-digital converter (TDC) circuit that measures the time at which the analog signal in a voltage form output from the sensing circuit unit 530 reaches a predetermined reference voltage level and converts the measured time into the digital signal $S_D$ or an analog-to-digital converter (ADC) circuit that measures the amount in which the level of the analog signal output from the sensing circuit unit 530 has changed for a predetermined time and converts the measured amount into the digital signal $S_D$. The operation unit 550 uses the digital signal $S_D$ to determine a touch input applied to the panel unit 510. As the embodiment of the present invention, the operation unit 550 may determine the number, coordinates, gesture operations, and the like, of the touch input applied to the panel unit 510.

When comparing the apparatuses for sensing capacitance shown in FIGS. 2 and 3 with the touch screen apparatus of FIG. 5, the node capacitors C11 to Cmn generated at the intersecting points between the first electrodes and the second electrodes correspond to the capacitor Cm of FIGS. 2 and 3. In addition, the driving circuit unit 520 of FIG. 5 may correspond to the driving circuit units 210 and 310 shown in FIGS. 2 and 3, the sensing circuit unit 530 may correspond to the first integration circuit units 220 and 320 shown in FIGS. 2 and 3, and the signal conversion unit 540 and the signal processing unit 550 may correspond to the control units 230 and 330 shown in FIGS. 2 and 3.

As set forth above, according to embodiments of the present invention, a difference between output voltages (a voltage difference) is compared with a predetermined reference level by applying a driving signal having a predetermined frequency to a first capacitor and integrating second and third capacitors connected to the first capacitor. When the voltage difference exceeds the reference level, it is estimated that a frequency of the driving signal applied to the first capacitor is equal to a frequency of a noise signal or is very close thereto to hop the frequency of the driving signal, thereby minimizing the effect of noise in the apparatus for sensing capacitance.

While the present invention has been shown and described in connection with the embodiments, it will be apparent to those skilled in the art that modifications and variations can be made without departing from the spirit and scope of the invention as defined by the appended claims.

What is claimed is:

1. An apparatus for sensing capacitance, the apparatus comprising;
    a driving circuit unit applying driving signals to a first capacitor;
    an integration circuit unit including a second capacitor and a third capacitor respectively charged by a change in capacitance generated in the first capacitor based on the driving signals to generate a predetermined output voltage and calculating a voltage difference between the output voltage of the second capacitor and the output voltage of the third capacitor; and
    a control unit comparing the voltage difference with a predetermined reference voltage, determining a frequency of a noise signal based on the comparison, and controlling operational times of a plurality of switches to control frequencies of the driving signals, based on the frequency of the noise signal.

2. The apparatus of claim 1, wherein the control unit determines a frequency and a phase of the noise signal based on the voltage difference.

3. The apparatus of claim 1, wherein the control unit hops frequencies of the driving signals so as to have values different from the frequency of the noise signal.

4. The apparatus of claim 1, wherein the integration circuit unit includes:
    a first integration circuit including the second capacitor and non-inversion-integrating the second capacitor by the driving signals; and
    a second integration circuit including the third capacitor and inversion-integrating the third capacitor by the driving signals.

5. The apparatus of claim 1, wherein the control unit includes;
    a comparison circuit unit comparing the voltage difference with the predetermined reference voltage; and
    a signal processing unit determining the frequency of the noise signal based on the comparison of the comparison circuit unit and controlling the frequencies of the driving signals.

6. The apparatus of claim 5, wherein the comparison circuit unit compares the voltage difference with a first reference level and a second reference level different from the first reference level, respectively, and
    the signal processing unit determines the frequencies of the driving signals applied to the first capacitor to be the frequency of the noise signal when the voltage difference is larger than the first reference level or lower than the second reference level.

7. The apparatus of claim 1, wherein the control unit controls the driving circuit unit such that a plurality of the driving signals having different frequencies are sequentially applied to the first capacitor and controls the integration circuit unit such that the second capacitor and the third capacitor are charged for a length of time corresponding to the same period and turn-on time of the plurality of driving signals, respectively.

8. A method for sensing capacitance, the method comprising:
    applying driving signals to a first capacitor;
    generating a first output voltage and a second output voltage from the first capacitor by charging each of a second capacitor and a third capacitor;
    calculating a voltage difference between the first output voltage and the second output voltage;
    comparing the voltage difference with a predetermined reference voltage;
    determining a frequency of a noise signal based on the comparison; and
    controlling operational times of a plurality of switches to control frequencies of the driving signals, based on the frequency of the noise signal.

9. The method of claim 8, wherein in the applying of the driving signals, a plurality of the driving signals having different frequencies are sequentially applied to the first capacitor.

10. The method of claim 9, wherein in the determining of the frequency of the noise signal, when the voltage difference is larger than a first reference level or lower than a second reference level, the frequencies of the driving signals applied to the first capacitor are determined to be a frequency of the noise signal.

11. The method of claim 9, wherein in the generating of the voltages, for each of the plurality of driving signals having different frequencies, the first output voltage and the second output voltage are generated by charging the second capacitor and the third capacitor for a length of time corresponding to the same period and turn-on time of each of the plurality of driving signals.

12. The method of claim 8, wherein in the generating of the voltages, the second capacitor is non-inversion-integrated by the driving signals applied to the first capacitor to generate the first output voltage, and the third capacitor is inversion-integrated by the driving signals applied to the first capacitor to generate the second output voltage.

13. The method of claim 8, wherein in the determining of the frequency of a noise signal, the frequency and a phase of the noise signal are determined from the voltage difference.

14. The method of claim 13, wherein in the controlling of the driving signals, frequencies of the driving signals are hopped so as to have values different from the frequency of the noise signal.

15. A touch screen apparatus, comprising:

a panel unit including a plurality of node capacitors respectively defined at intersecting points between a plurality of first electrodes and a plurality of second electrodes;

a driving circuit unit applying driving signals to the node capacitors;

a sensing circuit unit including a first capacitor and a second capacitor, respectively charged by a change in capacitance generated in the capacitors based on the driving signals to generate a predetermined output voltage and calculating a voltage difference between the output voltage of the first capacitor and the output voltage of the second capacitor; and a control unit determining a frequency of a noise signal based on the comparison, and controlling operational times of a plurality of switches to control frequencies of the driving signals, based on the frequency of the noise signal.

16. The touch screen apparatus of claim 15, wherein the control unit determines frequencies of the driving signals applied to the node capacitors by the driving circuit unit to be a frequency of the noise signal when the voltage difference is larger than a first reference level or lower than a second reference level.

17. The touch screen apparatus of claim 16, wherein the control unit controls the driving circuit unit such that the driving signals having frequencies different from the frequency of the noise signal are applied to the node capacitors.

* * * * *